US012047856B2

(12) United States Patent
Dizengof et al.

(10) Patent No.: US 12,047,856 B2
(45) Date of Patent: Jul. 23, 2024

(54) NOTIFICATION OF EMERGENCY CALLS TO USER CONTACTS

(71) Applicant: Carbyne Ltd., Tel-Aviv (IL)

(72) Inventors: Alexander Dizengof, Ashdod (IL); Amir Elichai, Tel Aviv (IL)

(73) Assignee: Carbyne Ltd., Tel-Aviv (IL)

( * ) Notice: Subject to any disclaimer, the term of this patent is extended or adjusted under 35 U.S.C. 154(b) by 333 days.

(21) Appl. No.: 17/718,434

(22) Filed: Apr. 12, 2022

(65) Prior Publication Data

US 2023/0328496 A1    Oct. 12, 2023

(51) Int. Cl.
*H04W 4/90* (2018.01)
*H04W 4/029* (2018.01)

(52) U.S. Cl.
CPC ............. *H04W 4/90* (2018.02); *H04W 4/029* (2018.02)

(58) Field of Classification Search
CPC ......... H04W 4/90; H04W 4/029; H04W 4/02; H04W 4/20; H04W 4/14
USPC ...................................................... 455/456.2
See application file for complete search history.

(56) References Cited

U.S. PATENT DOCUMENTS

2022/0312170 A1* 9/2022 Keller ............... H04M 3/42382

FOREIGN PATENT DOCUMENTS

WO    WO-2020155013 A1 *  8/2020  .............. H04W 4/02

OTHER PUBLICATIONS

Setting up Medical ID on iPhone and Apple Watch, Jul. 20, pp. 1-3 (Year: 2020).*

* cited by examiner

*Primary Examiner* — Tanmay K Shah

(57) ABSTRACT

Disclosed herein are methods and systems for notifying automatically emergency events reported by users to emergency contacts of the users, comprising receiving one or more advanced cellular location (AML) messages transmitted by one or more cellular devices of one or more users to an AML service when the cellular device(s) initiates an emergency call, the AML message(s) comprising a Mobile Station International Subscriber Directory Number (MSISDN) and a location of the cellular device(s), retrieving contact information of one or more emergency contacts associated with the MSISDN extracted from the AML message(s), and transmitting one or more emergency notifications to the emergency contact(s) according to the contact information. The one or more emergency notifications indicative of the emergency call(s) comprise an indication of the user(s) and the location of the cellular device(s) extracted from the AML message(s).

20 Claims, 3 Drawing Sheets

NOTIFICATION OF EMERGENCY CALLS TO USER CONTACTS

FIELD AND BACKGROUND OF THE INVENTION

The present invention, in some embodiments thereof, relates to notifying contacts of users about emergency events relating to the users, and, more specifically, but not exclusively, to automatically notifying contacts of users about emergency events relating to the users based on Advanced Mobile Location (AML) data transmitted by cellular devices of the users when initiating emergency calls.

AML services have become highly common and wide spread for a plurality of applications serving cellular devices capable of determining their location (e.g. geolocation sensors, network positioning, etc.) which may report their location with high accuracy and thus improve the service.

One highly valuable such application are AML services deployed to support Public Safety Answering Points (PSAPs) responding to emergency calls originating from cellular devices. When detecting that an emergency call is initiated (dialed), cellular devices configured to support AML, may transmit their location (data) to an AML service which may forward this location data to the PSAP responding and handling the emergency call.

Availability of the accurate location of the cellular devices, and hence of the associated users using the cellular devices to report the emergency events, may naturally significantly increase efficiency, rapidness and/or quality of the response provided by the PSAP and/or emergency services and/or teams (police, fire department, medical care, etc.) to the emergency events.

SUMMARY OF THE INVENTION

According to a first aspect of the present invention there is provided a method of notifying automatically emergency events reported by user to emergency contacts of the users, comprising using one or more processors of notification system for:

Receiving one or more advanced cellular location (AML) messages transmitted by one or more cellular devices of one or more users to an AML service when the one or more cellular devices initiate one or more emergency calls. The one or more AML messages comprising a mobile station international subscriber directory number (MSISDN) and a location of the one or more cellular devices.

Retrieving contact information of one or more emergency contacts associated with the MSISDN extracted from the one or more AML messages.

Transmitting one or more emergency notifications to the one or more emergency contacts according to the contact information. The one or more emergency notifications indicative of the one or more emergency calls comprise an indication of the one or more users and the location of the one or more cellular devices extracted from the one or more AML messages.

According to a first aspect of the present invention there is provided a system for notifying automatically emergency events reported by users to emergency contacts of the users, comprising one or more processors configured to execute a code. The code comprising:

Code instructions to receive one or more AML messages transmitted by one or more cellular devices of one or more users to an AML service when the one or more cellular devices initiate one or more emergency calls. The one or more AML messages comprising an MSISDN and a location of the one or more cellular devices.

Code instructions to retrieve contact information of one or more emergency contacts associated with the MSISDN extracted from the one or more AML messages.

Code instructions to transmit one or more emergency notifications to the one or more emergency contacts according to the contact information. The one or more emergency notifications indicative of the one or more emergency calls comprise an indication of the one or more users and the location of the one or more cellular devices extracted from the one or more. AML messages.

In a further implementation form of the first and/or second aspects, the notification system is implemented by one or more servers hosting the ANIL service.

In a further implementation form of the first and/or second aspects, the one or more emergency notifications are transmitted via an SMS message, and/or a hypertext transfer protocol secure (HTTPS) based message.

In a further implementation form of the first and/or second aspects, the one or more emergency contacts and their contact information are defined in an account of the one or more users created when the one or more users sign up for the notification system.

In a further implementation form of the first and/or second aspects, the one or more emergency contacts are members of a group consisting of: a personal contact, a corporate emergency team member, and/or an insurance company representative.

In a further implementation form of the first and/or second aspects, the one or more emergency notifications further comprise an indication that the one or more emergency calls failed in case the one or more emergency calls are not received by one or more PSAPs.

In a further implementation form of the first and/or second aspects, the one or more emergency notifications further comprise event data relating to one or more emergency events reported by the one or more emergency calls. The event data comprises one or more members of a group consisting of: a type of the respective emergency event, and/or one or more media items captured by the one or more cellular devices.

In a further implementation form of the first and/or second aspects, the one or more emergency notifications further comprise one or more personal information items relating to the one or more users. The one or more personal data items are members of a group comprising: an age, a blood type, a physical attribute, a physical condition, a medical data item, a home address, a work address, an email address, one or more image, one or more video clip, one or more audio clip, and/or one or more chat transcript.

In a further implementation form of the first and/or second aspects, the one or more personal data items are retrieved from one or more of: an account of the one or more users, and/or one or more employee records of a corporate employing the one or more users.

In an optional implementation form of the first and/or second aspects, the one or more personal data items are transmitted to one or more PSAPs in response to one or more AML queries received from the one or more PSAPs. The one or more PSAPs transmit the one or more AML queries in response to receiving the one or more emergency calls from the one or more cellular devices.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
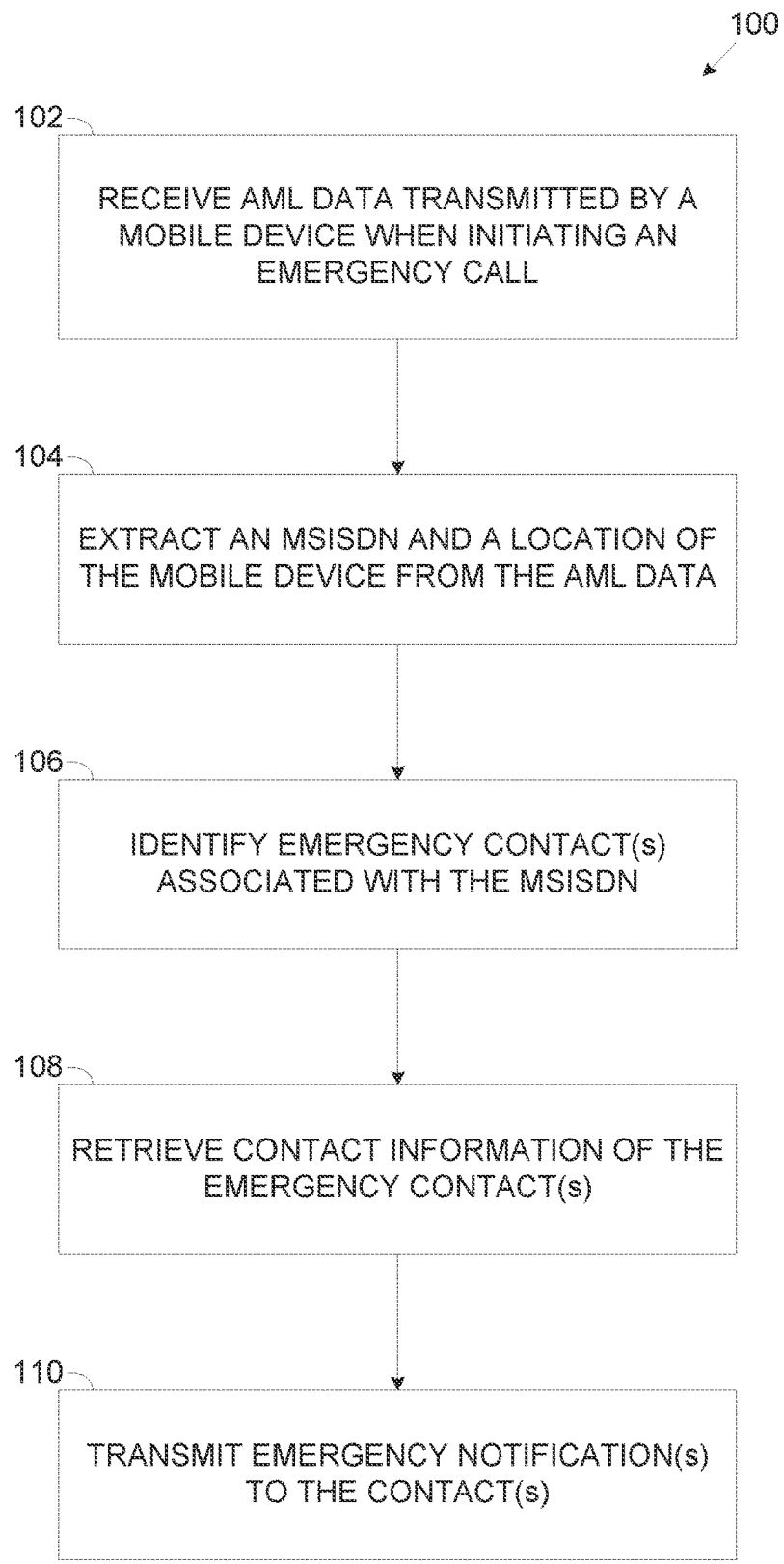
FIG. 1 is a flowchart of an exemplary process of notifying automatically contacts of a user about emergency events relating to the user, according to some embodiments of the present invention.

The present invention, in some embodiments thereof, relates to notifying contacts of users about emergency events relating to the users, and, more specifically, but not exclusively, to automatically notifying contacts of users about emergency events relating to the users based on AML data transmitted by cellular devices of the users when initiating emergency calls.

According to some embodiments of the present invention, there are provided methods, systems, devices and computer program products for notifying, automatically, emergency contacts of users about emergency events reported by the users using their cellular devices.

As known in the art, cellular devices, for example, cellular phones, wearable devices, carry-able devices and/or the like having cellular network connectivity may be configured to support AML, in particular to support emergency calls initiated from the cellular devices. Such cellular devices may be configured to transmit one or more AML messages to one or more AML services when detecting an emergency call initiated (dialed) from the cellular device to one or more PSAPs, for example, 911 in the US, 211 in Europe and/or the like.

The AML messages transmitted by these cellular devices may include at least a (current) location of the cellular device and an identifier (ID) of the cellular device.), for example, a Mobile Station International Subscriber Directory Numbers (MSISDN) associated with a Subscriber Identity Module (SIM) installed in the cellular device which may uniquely identify the cellular device and hence uniquely identify the user associated with the cellular device (e.g. owner, user, etc.).

The cellular devices may acquire their location using one or more methods and/or techniques as known in the art, for example, collect location data from one or more geolocation sensors, receive location data from network infrastructure equipment (e.g. base station, router, etc.), obtain location data from one or more devices coupled and/or paired with the cellular device, receive location data from one or more application executed by the cellular device (e.g. navigation app, etc.) and/or the like.

Optionally, the AML message(s) transmitted by one or more of cellular devices to the AML service may include further event data relating to the emergency event, for example, a type of the emergency event, one or more media items (e.g., picture, audio, video, etc.) captured by the cellular device and/or the like.

The AML service may be configured to alert a notification system of one or more AML messages received from one or more of the cellular devices which are indicative of respective emergency events reported by users initiating emergency calls to the PSAPs using their cellular devices. For example, in response to each AML message received from one of the cellular devices, the AML service may transmit AML data to the notification system which comprises at least the ID of the cellular device, for example its MSISDN and the location of the cellular devices as reported by the AML message(s).

Optionally, the AML data transmitted to the notification system in response to one or more of the emergency events may include at least some of the event data relating to the respective emergency event extracted, if available, from the AML message(s) received from the respective cellular device.

Optionally, the notification system may be integrated in the AML service.

For each emergency event, the notification system may extract from the AML data received from the AML service the MSISDN and location of the related user's cellular device and may locate emergency contacts associated with the related user.

The emergency contacts and their contact information may be stored in one or more user data records, for example, a file, a list, a table, a database and/or the like accessible to the notification system. In particular, the emergency contacts may be correlated (associated) to the users of the cellular devices in the user data record, specifically, correlated to the IDs of the cellular devices associated with the users, for example, the MSISDNs of the cellular devices. As such the MSISDN of each cellular device of each user may map the emergency contact(s) associated with the respective user.

The emergency contacts may include, for example, one or more personal contacts of the user, for example, a family member, a relative, an acquaintance and/or the like. In another example, the personal contacts may include one or more colleagues and/or corporate members of a corporate in which the user is employed. In another example, the personal contacts may include one or more people and/or representatives of one or more companies, firms, servicers and/or the like providing service to the user and/or to the corporate employing the user, for example, an insurance company and/or the like.

The emergency contacts and their contact information may be provided, for example, by one or more of the users when signing up for such a notification service. In another example, the emergency contacts and their contact information may be retrieved from one or more records maintained by the corporate, for example, a Human Resources (HR) record, a corporate database, an emergency protocol record and/or the like.

For each such emergency event reported by one of the users using his associated cellular device, the notification system may transmit one or more emergency notifications (messages) to one or more of the contacts associated with the respective according to their contact information. The emergency notification(s) transmitted in response to the emergency event may include at least the location of the cellular device (and hence the user) which transmitted the AML message(s) when detecting the emergency call and the identity of the user associated with the cellular device.

Optionally, in the emergency notification(s) transmitted in response to one or more emergency events, the notification engine may include at least some of the event data if included in the AML data received from the AML service for the respective emergency event.

The notification system may transmit the emergency notification(s) via one or more communication channels and/or according to one or more communication protocols. For example, the notification system may transmit one or more of the emergency notifications via one or more Short Message Service (SMS) messages transmitted via one or more cellular networks. In another example, the notification system may transmit one or more of the emergency notifications via one or more network based text messages, for example, a WhatsApp message and/or the like. In another example, the notification system may transmit one or more of the emergency notifications via one or more one or more wired and/or wireless networks according to one or more communication protocols, for example, Hyper Text Transport protocol (HTTP), HTTP Secure (HTTPS), and/or the like.

Optionally, the may transmit back to the PSAP(s) data and/or information relating to one or more of the users which initiated the emergency calls to report of the emergency events. Such data may include, for example, physical, medical and/or personal information, for example, blood type, age, weight, height, disease(s) and/or disabilities the user may suffer, a home address, a work address, an email address, a contact person information and/or the like. In particular, the notification system may respond with this data to the AML service(s) which may forward the data to the PSAP(s).

Optionally, in case one or more of the emergency callas are not received (answered) by none of the PSAP(s), the notification system may configure accordingly one or more of the emergency notifications transmitted to one or more of the emergency contacts to indicate that the respective emergency call(s) failed.

Automatically notifying the emergency contacts associated with users of emergency events relating to the users may present major advantages and benefits.

First, notifying emergency contacts of the users about the emergency event relating to the users may enable the emergency contacts to respond to the emergency events and take one or more actions accordingly either independently and/or in cooperation with the PSAPs dispatchers and/or the emergency services and/or teams (police, fire department, medical care, etc.) sent to respond to the emergency events.

For example, assuming a certain user reporting an emergency event is an employee of a corporate having a fast emergency response team located nearby the user. In such case the emergency response team which may be listed as emergency contact of the user may be notified of the emergency event and may respond to it, for example, arrive at the emergency scene, send equipment, gear and/or materials to the emergency scene and/or the like. There may be scenarios and/or places where the response of the emergency response team may be faster and/or better than that of the local emergency services which may lead to faster and/or better response to the emergency event which may reduce damage, injury and possibly save lives.

In another example, a certain user reporting an emergency event may be involved with one or more companies providing him service, for example, an insurance company. In such case, one or more representatives of the insurance company listed as emergency contacts of the user may travel to the emergency scene to assess damage, injury and/or the like relating to the user.

Moreover, while the users initiate the emergency calls to report emergency events, one or more of the users may be unable to effectively communicate with the dispatchers at the PSAPs. For example, one or more of the users may be children, disabled people (e.g. mute, stutterer, etc.), foreign people lacking the language and/or the like. In another example, one or more of the cellular device may be configured to automatically initiate emergency calls when detecting one or more emergency scenario relating to the user, for example, a critical medical condition of the user (e.g. seizure, heart attack, etc.), a violence event (e.g. gunfire, etc.), a car accident and/or the like. In such cases, the emergency contacts of such users may contact the PSAPs and/or the emergency services to provide additional information regarding the users involved in the reported emergency events. This may significantly improve efficiency, rapidness, and/or quality of the response and handling of such emergency events by the PSAPs and/or the emergency services.

Furthermore, adjusting the emergency notification(s) to indicate that an emergency call failed may inform the emergency contact(s) that the emergency call was not received and/or answered by any of the PSAPs which therefore do not handle and/or respond to the emergency event relating to the failed emergency call. This fact may cause, encourage and/or hasten one or more of the emergency contact(s) receiving the emergency notifications to take active action, for example, call (alert) one or more of the PSAPs and report at least a location of the emergency event as reported by the notification system in the emergency notification(s).

Also, assuming the emergency notification(s) transmitted to the emergency contact(s) in response to one or more emergency events include at least some of the event data, for example, emergency event type, media items, etc., the emergency contact(s) may provide this information to the PSAPs, which may thus more efficiently and/or effectively respond to the respective emergency event.

In addition, providing the PSAPs with additional data and information relating to the users reporting the emergency events, for example, age, blood type, known diseases, disabilities and/or the like may provide a more extensive knowledge and picture of the emergency events and may thus enable the PSAPs to better handle and respond to these emergency events. For example, the notification system may inform the PSAP that a certain user reporting an emergency event has a certain blood type. In such case, the dispatcher(s) at the PSAP which handle the emergency event may instruct a medical service team sent to the emergency scene to equip with packed blood cells of the certain blood type. In another example, assuming a certain user reporting an emergency event suffers a certain disease which requires special equipment and/or medicine. In such case, the dispatcher(s) at the PSAP which receives the emergency call may inform a medical service team responding to the emergency event to pick the special equipment or medicine.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of notifying automatically contacts of a user about emergency events relating to the user, according to some embodiments of the present invention.

An exemplary process 100 may be executed by a notification system for notifying emergency contacts of users about emergency events relating to the users. In particular, the notification system may identify the emergency events based on AML messages transmitted by cellular devices of the users when detecting emergency calls initiated by the users to report the emergency events to one or more PSAPs.

Figure 2A:
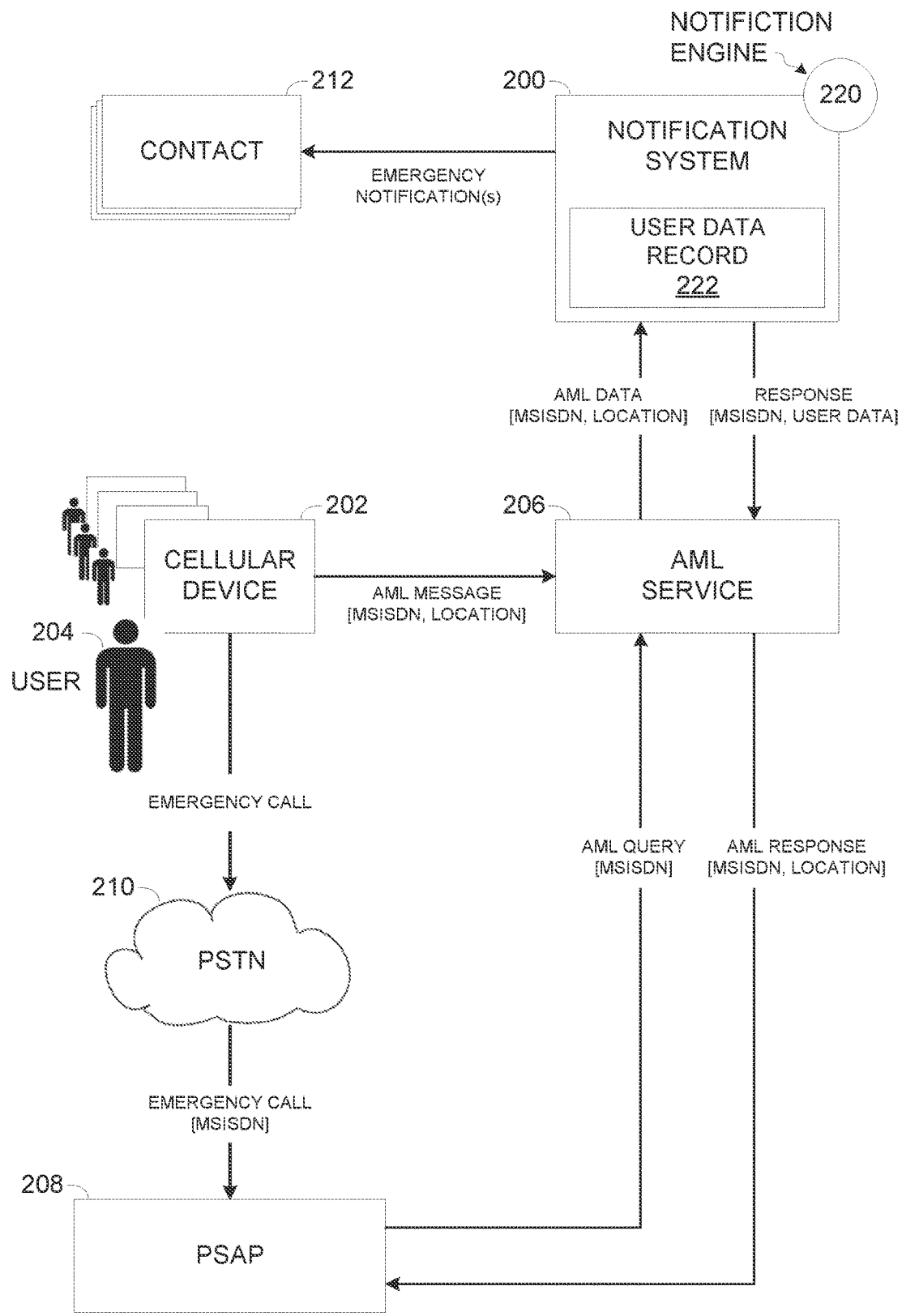
FIG. 2A and FIG. 2B are schematic illustrations of an exemplary system for notifying automatically contacts of users about emergency events relating to the users, according to some embodiments of the present invention.
Figure 2B:
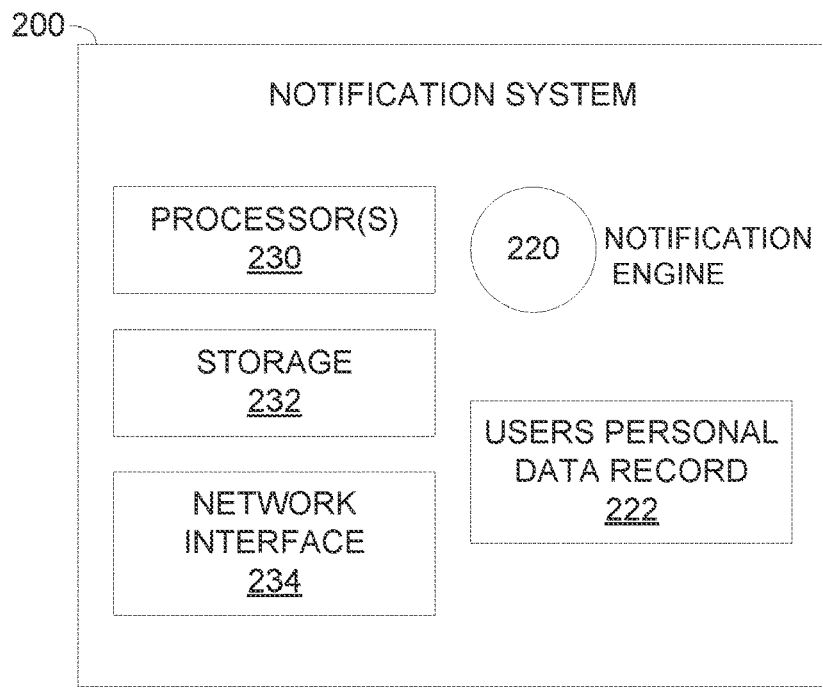
Figure 2B:
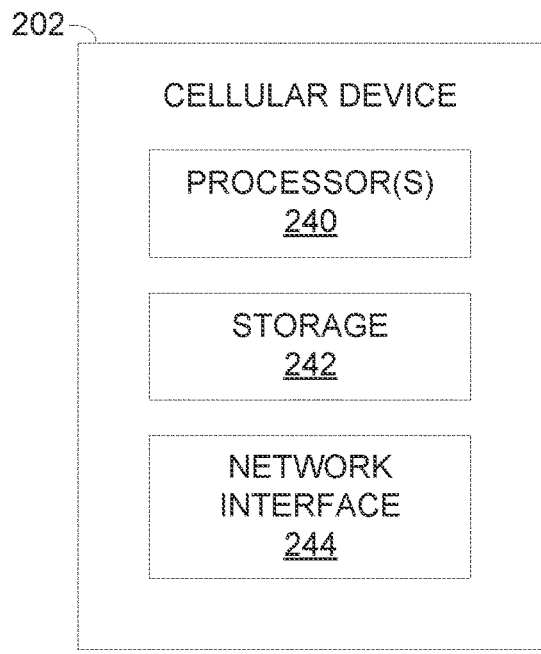

Reference is also made to FIG. 2A and FIG. 2B, which are schematic illustrations of an exemplary system for notifying automatically emergency contacts of users about emergency events relating to the users, according to some embodiments of the present invention.

As seen in FIG. 2A, an exemplary notification system 200 may be deployed to communicate with one or more AML services 206 configured to receive AML messages from one or more cellular devices 202 associated with respective users 204, for example, a cellular phone, a wearable device, a carry-able device and/or the like.

Cellular devices 202 which support AML may be configured, as known in the art, to transmit one or more AML messages to the AML service 206 when detecting an emergency call initiated (dialed) from the cellular device 202 to one or more PSAPs 208.

The AML message(s) transmitted by each such cellular device may include at least location information of the respective cellular device 202, for example, a geolocation, coordinates, a location relative to one or more reference locations, and/or the like and a MSISDN (MSISDN) (often interchangeably designated phone number or caller ID) of the respective cellular device.

The location (data) of the cellular device 202 may be obtained from one or more sensors, applications and/or services. For example, the cellular device 202, for example, a cellular smart watch may collect the location data from one or more location sensors of the cellular device 202, for example, a Global Poisoning Sensor (GPS), an Inertial Measurement Unit (IMU) and/or the like. In another example, the cellular device 202, for example, a cellular phone may collect the location data from a navigation application executed by the cellular device 202. In another example, the cellular device 202 may obtain the location data from one or more devices, for example, a watch, a wearable device and/or the like communicatively coupled to the cellular device 202 via one or more communication channels, for example, Bluetooth, Wi-Fi and/or the like.

The MSISDN of each cellular device 202 may be assigned to uniquely identify the respective cellular devices 202 in one or more phone networks, for example, a cellular network, a Public Switched Telephone Networks (PSTN) 210 and/or the like. In particular, a unique MSISDN may be associated with each Subscriber Identification Module (SIM) installed in each of the cellular devices 202. The MSISDN may be allocated by one or more entities, for example, an operator of the cellular network, and/or a provider of cellular service and/or the like.

Emergency calls initiated by one or more of the cellular devices 202, for example, 911 in the US, 112 in Europe and/or the like may be routed from the cellular devices 202 to the PSAPs 208 through one or more cellular networks and further via the PSTN 210 connecting PSAPs 208, specifically legacy PSAPs 208 to the telephony system.

Upon detection of an emergency call initiated from a certain cellular device 202, the cellular device 202 if configured to support AML, may automatically transmit one or more AML messages to the AML service 206. The cellular devices 202 may transmit the AML message(s) using one or more protocols and/or communication channels. For example, the AML messages transmitted by the cellular device 202 may include one or more SMS messages transmitted via one or more SMS services, cellular networks, PSTNs and/or the like. In another example, the cellular device 202 may transmit the AML message(s) via one or more networks, for example, Local Area Network (LAN), Wide Area Network (WAN), Municipal Area Network (MAN), cellular network 206, the internet and/or the like using one or more data transfer protocols, for example, HTTP, HTTPS and/or the like.

The PSAP 208 receiving the emergency call from one or more of the cellular device 202 may communicate with the AML service 206 via one or more networks, for example, LAN, WAN, MAN, cellular network, the internet and/or the like to obtain the location (data) of the respective cellular devices 202.

The PSAP(s) 208 and the AML service 206 may use the unique MSISDNs of the cellular devices 202 to identify each cellular device 202 and effectively associate each cellular device 202 with its location data.

Therefore, when receiving an emergency call from one of the cellular devices 202, the PSAP 208 may transmit (issue) one or more AML queries to the AML service 206 with the MSISDN of the respective cellular device 202 identified by the PSTN 210 for the incoming emergency call. In response, the AML service 206 may transmit to the PSAP 208 one or more AML response messages comprising at least the location data extracted from the AML message(s) received from the cellular device 202 associated with the MSISDN indicated in the AML query(s).

As seen in FIG. 2B, the notification system 200, for example, a server, a computing node, a cluster of computing nodes and/or the like may include a processor(s) 230, a storage 232 for storing data and/or code (program store) and a network interface 234.

Via the network interface 234, the notification system 200 may communicate with one or more network resources, for example, the AML service 206, the PSAP 208, and/or the like via one or more wired and/or wireless networks, for example, a LAN, a WAN, a MAN, a cellular network, the internet, the PSTN 210 and/or the like.

The processor(s) 230, homogenous or heterogeneous, may include one or more processing nodes arranged for parallel processing, as clusters and/or as one or more multi core processor(s). The storage 232 may include one or more non-transitory memory devices, either persistent non-volatile devices, for example, a ROM, a Flash array, a hard drive, an SSD, a magnetic disk and/or the like as well as one or more volatile devices, for example, a RAM device, a cache memory and/or the like. The storage 232 may further comprise one or more local and/or remote network storage resources, for example, a storage server, a Network Attached Storage (NAS), a network drive, a cloud storage service and/or the like accessible via the network interface 234.

The processor(s) 230 may execute one or more software modules, for example, a process, a script, an application, an agent, a utility, a tool, an Operating System (OS), a service, a plug-in, an add-on and/or the like each comprising a plurality of program instructions stored in a non-transitory medium (program store) such as the storage 232 and executed by one or more processors such as the processor(s) 230.

Optionally, the processor(s) 230 includes, utilizes and/or applies one or more hardware elements available in the discovery system 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU) and/or the like.

The processor(s) 230 may therefore execute one or more functional modules utilized by one or more software modules, one or more of the hardware modules and/or a combination thereof. For example, the processor(s) 230 may execute a notification engine 220 configured to execute the process 100.

The notification system 200 may further store one or more user data records 222, for example, a file, a list, a table, a database and/or the like storing data relating to one or more of the users 204. One or more of the data record(s) 222 may be locally stored by the notification system, for example, in the storage 232. However, the one or more of the data record(s) 222 may be stored in one or more of the remote storage resources accessible via the network interface 234.

The data relating to one or more of the users 204 that is stored in the user data record(s) 222 may include at least a contact list listing emergency contacts of the user 204 and contact information of the emergency contact(s) listed for the user 204, for example, a phone number (MSISDN) of a landline phone and/or a cellular phone of the emergency contact, a pager number of the emergency contact, an email address of the emergency contact, an address of the emergency contact and/or the like.

Specifically, the emergency contact(s) of each user 204 and its contact information may be stored in the user data record(s) 222 in correlation with the respective user 204, in particular with the MSISDN of the cellular device 202 associated with the respective user 204. This means that the emergency contact(s) associated with each user 204 are mapped in the user data record(s) 222 by the MSISDN of one or more of the cellular devices 202 associated with the respective user 204.

The emergency contacts of each of the users 204 may include one or more personal contacts of the user 204, for example, a family member, a relative, an acquaintance and/or the like. In another example, the emergency contacts may include one or more colleagues of the user 204 and/or members of a corporate employing the user 204, i.e., a corporate for which the user 204 works. For example, assuming the corporate has some sort of emergency team and/or HR team which is assigned to handle emergency events relating to employees of the corporate, the emergency contacts may include one or more emergency team members. In another example, the emergency contacts may include one or more representatives of one or more insurance companies serving the user 204, for example, an insurance agent, a team member of the insurance company emergency team and/or the like.

However, the user data record(s) 222 may further comprise additional information and/or data items relating to one or more of the users 204, for example, an age of the user 204, a home address of the user 204, a work address of the user 204, an email address of the user 204, one or more images (pictures) relating to the user 204, one or more video clips relating to the user 204, one or more audio clips relating to the user 204, one or more chat transcripts relating to the user 204 and/or the like.

The additional data items included in the user data record(s) 222 may further comprise one or medical and/or physical information relating to one or more of the users 204. The physical information relating to the user 204 may include one or more physical attributes of the user 204, for example, blood type, height, weight, and/or the like. In another the physical information relating to the user 204 may include one or more physical conditions of the user 204, for example, a disability (e.g. handicap, accessibility, etc.) and/or the like. The medical information relating to the user 204, may include one or more medical data items relating to the user 204, for example, an illness, a disease, a syndrome, an allergy, and/or the like a disability (e.g. handicap, accessibility, etc.) and/or the like.

One or more of the data items relating to one or more of the users 204 may be retrieved, for example, from one or more accounts of the respective users 204 and stored in the user data record(s) 222. Such an account may be created for one or more of the users 204 when signing up for the notification service provided by the notification system 206. Optionally, one or more of the user data records 222 may be utilized by one or more records and/or services hosting account information of one or more of the users 204.

In another example, one or more of the data items relating to one or more of the users 204 may be retrieved from one or more employee records maintained by a corporate employing one or more of the users 204, for example, an HR record, a corporate database, an emergency protocol record, an employee private area and/or the like.

Optionally, the notification system 200 and/or the notification engine 220 may be utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2), IBM Cloud, and/or the like.

As described herein before, the notification system 200 may be separate from the AML service 206 and may communicate with the AML service 206 via one or more of the networks to exchange data with the AML service 206, for example, AML data, AML messages, data relating to one or more of the users 204 and/or the like. However, optionally the notification system 200 may be integrated with the AML service 206 such that the discovery engine 220 may be executed by one or more of the servers and/or computing nodes hosting (executing) the AML service 206.

Each of the cellular devices 202, for example, a cellular phone, a wearable device, a carry-able device and/or the like may include a processor(s) 240 such as the processor(s) 230, a storage 242 for storing data and/or code (program store) and a network interface 244.

Via its network interface 244 comprising one or more network adaptors and/or interfaces, each cellular device 202 may connect to one or more cellular networks and may further connect through the cellular network(s) to one or more other networks, for example, the PSTN 212, the internet, a LAN, a WAN, a MAN and/or the like. One or more of the cellular devices 202 may therefore communicate, via their respective network interfaces 244, with one or more network resources connected to these networks, for example, the PSAP(s) 208, the AML service 206, the notification system 200 and/or the like.

As described for the processor(s) 230, the processor(s) 240 may execute one or more software modules each comprising a plurality of program instructions stored in a non-transitory medium (program store) such as the storage 242 and executed by one or more processors such as the processor(s) 240. Optionally, the processor(s) 250 includes, utilizes and/or applies one or more hardware elements available in one or more of the cellular devices 202, for example, a circuit, a component, an IC, an ASIC, an FPGA, a DSP, a GPU and/or the like.

The processor(s) 240 may therefore execute one or more functional modules utilized by one or more software modules, one or more of the hardware modules and/or a combination thereof. For example, the processor(s) 240 may execute one or more functional modules to initiate emergency calls, transmit AML messages to the AML service 206 and/or the like.

For brevity, the process 100 is presented and described for automatically notifying one or more emergency contacts of a single user 204 using a single cellular device 202 about a single emergency event relating to the user 204. This, however, should not be construed as limiting since the process 100 may be repeated for a plurality of emergency events reported by the user 204 using the cellular device 202. Moreover, as may be apparent to a person skilled in the art, the process 100 and the notification system 200 may be scaled to support a plurality of users 204 using a plurality of cellular devices 202 to automatically notify emergency contacts of the plurality of users about emergency events relating to the plurality of users.

As shown at 102, the process 100 starts with the notification engine 220 receiving from the AML service 206 AML data comprising at least the MSISDN and (current) location of one of the cellular devices 202 used by its associated user 204 to report an emergency event.

As described herein before, the cellular device 202 configured to support AML, may automatically transmit one or more AML messages to the AML service 206 when detecting an emergency call initiated by the associated user 204 using the cellular device 202 to one or more of the PSAPs 208. The cellular device 202 may be configured to transmit the AML message(s) using one or more protocols and/or communication channels, for example, one or more SMS messages, one or more HTTP messages, one or more HTTPS messages and/or the like.

Optionally, the AML message(s) transmitted by one or more of cellular devices 202 to the AML service 206 may include further event data relating to the emergency event reported by the user 204 using the cellular device 202. The event data may include, for example, a type of the emergency event, for example, a car accident, a fire, a violence event, a medical event, and/or the like. In another example, the event data may include one or more media items, for example, a picture, a video clip, an audio clip captured by the cellular device 202 during the emergency event. In such case, the AML service 206 may include at least some of the event data in the AML data transmitted to the notification engine 220.

The AML service 206 may operate in push mode such that in response to receiving one or more AML messages from one of the cellular devices 202 associated with a respective one of the users 204, the AML service 206 may transmit the AML data to the notification system 200, specifically to the notification engine 220.

The AML data may therefore include the AML message(s) received from the cellular device 202 which may comprise at least the MSISDN of the cellular device 202 and its (current) location. However, the AML data transmitted by the AML service 206 to the notification engine 220 may include processed data encapsulated and/or organized according to one or more formats and/or protocols rather than the actual AML messages as originally received from the cellular device 202. For example, in order to reduce communication bandwidth between the notification system 200 and the AML service 206, the AML service 206 may pack the AML data of several cellular devices 202 which may have reported of emergency events during substantially the same time period.

In case the notification system 200 is integrated with the AML service 206, the notification engine 220 executed by the AML service 206, specifically by one or more servers hosting the AML service 206 may have access to the AML message(s) received by the AML service 206 from the cellular device 202.

As shown at 104, the notification engine 220 may extract the MSISDN and the location of the cellular device 202 from the AML data received from the AML service 206.

As shown at 106, the notification engine 220 may identify the emergency contacts associated with the user 204.

Specifically, the notification engine 220 may access the user data record(s) 222 and identify the emergency contact(s) correlated (mapped) in the user data record(s) 222 with the MSISDN extracted from the AML data which is the MSISDN of the cellular device 202 associated with the users 204.

As shown at 108, the notification engine 220 may further access the user data record(s) 222 to retrieve the contact information of the emergency contact(s) associated with the user 204.

As shown at 110, the notification engine 220 may transmit one or more emergency notifications to one or more of the emergency contacts associated with the user 204 in order to inform and/or alert the emergency contact(s) of the emergency event relating to the user 204.

The emergency notification(s) which are indicative of the emergency event relating to the user 204 and reported using the cellular device 202 associated with the user 204 may include at least an indication (identity) of the user 204 (e.g. name, MSISDN, etc.) and the location of the user 204, i.e., the location reported by the cellular device 202 to the AML service 206.

Optionally, the notification engine 220 may include at least some of the event data in one or more of the emergency notification(s), for example, the type of the emergency event, one or more of the media items (e.g. picture, audio, video, etc.) and/or the like if such event data is available in the AML data received from the AML service 206.

The notification engine 220 may transmit the emergency notification(s) to the emergency contact(s) using the contact information retrieved from the user data record(s) 222, for example, the MSISDN, the email address, the pager number and/or the like associated with the emergency contact(s).

The notification engine 220 may transmit the emergency notification(s) to the emergency contact(s) using one or more communication channels and/or protocols. For example, the notification engine 220 may transmit the emergency notification(s) in one or more SMS messages transmitted via one or more SMS services, cellular networks, PSTNs and/or the like. In another example, the notification engine 220 may transmit the emergency notification(s) via one or more of the wired and/or wireless networks, for example, LAN, WAN, MAN, cellular network, the internet and/or the like according to one or more data transfer protocols, for example, HTTP, HTTPS and/or the like.

The emergency contact(s) receiving the emergency notifications may take one or more actions in response to the emergency event relating to the users 204. For example, one or more of the emergency contact(s) may notify one or more of the PSAPs 208 and/or emergency services (e.g. police, fire department, medical care, etc.) of the emergency event. In another example, one or more of the emergency contact(s), for example, the corporate emergency team may take active actions to respond to emergency event, either independently or in cooperation with the PSAPs 208 and/or the emergency services, for example, arrive at the emergency scene, send equipment, gear and/or materials to the emergency scene and/or the like. In another example, one or more of the emergency contact(s), for example, the insurance company representative may travel to the emergency scene to assess damage, injury and/or the like relating to the user 204.

Optionally, the notification engine 220 may transmit one or more data items relating to the user 204 to the PSAP 208 which responds and handles the emergency call received from the cellular device 202 used by the associated user 204 to report the emergency event.

The notification engine 220 may access the user data record(s) 222 and retrieve one or more of the additional data items associated with the user 204. For example, using the MSISDN of the cellular device 202 used by the user 204 which is received from the AML service 206, the notification engine 220 may identify and retrieve one or more data items mapped by the MSISDN in the user data record(s) 222. Such data items may comprise, as described herein before, for example, a medical and/or physical data item relating to the user 204, for example, age, illness, disease, syndrome, blood type, height, weight, disability and/or the like as well as one or more other data items such as, for example, email address, media items (e.g. picture, video clip, audio clip, etc.) and/or the like.

The notification engine 220 may then transmit the retrieved additional data items to the PSAP 208. In case the notification system 200 is separate and independent of the AML service 206, the notification engine 220 may respond to the AML service 206 with one or more response messages comprising the additional data item(s) and the AML service 206 may transmit them to the PSAP 208. Optionally, the notification engine 220 may directly communicate with the PSP 208 via one or more of the wired and/or wireless networks to transmit the additional data item(s) to the PSAP 208. In case the notification system 200 is integrated with the AML service 206, the notification engine 220 executed by the AML service 206 may also directly communicate with the PSAP 208 via the networks and respond to the PSAP 208 with the additional data item(s) relating to the user 204.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms cellular network, cellular device, SIM, PSAP, AML service, and AML message are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of notifying automatically emergency events reported by users to emergency contacts of the users, comprising:
    using at least one processor of notification system for:
        receiving at least one advanced cellular location (AML) message transmitted by at least one cellular phone of at least one user to an AML service when the at least one cellular phone initiates at least one emergency call, the at least one AML message comprising a mobile station international subscriber directory number (MSISDN) and a location of the at least one cellular device;
        retrieving contact information of at least one emergency contact associated with the MSISDN extracted from the at least one AML message; and
        transmitting at least one emergency notification to the at least one emergency contact according to the contact information, the at least one emergency notification indicative of the at least one emergency call comprises an indication of the at least one user and the location of the at least one cellular device extracted from the at least one AML message.

2. The method of claim 1, wherein the notification system is implemented by at least one server hosting the AML service.

3. The method of claim 1, wherein the at least one emergency notification is transmitted via at least one of: an SMS message, and a hypertext transfer protocol secure (HTTPS) based message.

4. The method of claim 1, wherein the at least one emergency contact and its contact information is defined in an account of the at least one user created when the at least one user signs up for the notification system.

5. The method of claim 1, wherein the at least one emergency contact is a member of a group consisting of: a personal contact, a corporate emergency team member, and an insurance company representative.

6. The method of claim 1, wherein the at least one emergency notification further comprises an indication that the at least one emergency call failed in case the at least one emergency call is not received by at least one PSAP.

7. The method of claim 1, wherein the at least one emergency notification further comprises event data relating to at least one emergency event reported by the at least one emergency call, the event data comprises at least one member of a group consisting of: a type of the emergency event, and at least one media item captured by the at least one cellular device.

8. The method of claim 1, wherein the at least one emergency notification further comprises at least one personal information item relating to the at least one user, the at least one personal data item is a member of a group comprising: an age, a blood type, a physical attribute, a physical condition, a medical data item, a home address, a work address, an email address, at least one image, at least one video clip, at least one audio clip, and at least one chat transcript.

9. The method of claim 8, wherein the at least one personal data item is retrieved from at least one of: an account of the at least one user, and at least one employee record of a corporate employing the at least one user.

10. The method of claim 8, further comprising transmitting the at least one personal data item to at least one PSAP in response to at least one AML query received from the at least one PSAP, the at least one PSAP transmits the at least one AML query in response to receiving the at least one emergency call from the at least one cellular device.

11. A system for notifying automatically emergency events reported by users to emergency contacts of the users, comprising:
    at least one processor configured to execute a code, the code comprising:
        code instructions to receive at least one advanced cellular location (AML) message transmitted by at least one cellular phone of at least one user to an AML service when the at least one cellular phone initiates at least one emergency call, the at least one AML message comprising a mobile station international subscriber directory number (MSISDN) and a location of the at least one cellular device;

code instructions to retrieve contact information of at least one emergency contact associated with the MSISDN extracted from the at least one AML message; and code instructions to transmit at least one emergency notification to the at least one emergency contact according to the contact information, the at least one emergency notification indicative of the at least one emergency call comprises an indication of the at least one user and the location of the at least one cellular device extracted from the at least one AML message.

12. The system of claim 11, wherein the notification system is implemented by at least one server hosting the AML service.

13. The system of claim 11, wherein the at least one emergency notification is transmitted via at least one of: an SMS message, and a hypertext transfer protocol secure (HTTPS) based message.

14. The system of claim 11, wherein the at least one emergency contact and its contact information is defined in an account of the at least one user created when the at least one user signs up for the notification system.

15. The system of claim 11, wherein the at least one emergency contact is a member of a group consisting of: a personal contact, a corporate emergency team member, and an insurance company representative.

16. The system of claim 11, wherein the at least one emergency notification further comprises an indication that the at least one emergency call failed in case the at least one emergency call is not received by at least one PSAP.

17. The system of claim 11, wherein the at least one emergency notification further comprises event data relating to at least one emergency event reported by the at least one emergency call, the event data comprises at least one member of a group consisting of: a type of the emergency event, and at least one media item captured by the at least one cellular device.

18. The system of claim 11, wherein the at least one emergency notification further comprises at least one personal data item relating to the at least one user, the at least one personal data item is a member of a group comprising: an age, a physical condition, a medical data item, a disability, at least one image, at least one video clip, at least one audio clip, and at least one chat transcript.

19. The system of claim 18, wherein the at least one personal data item is retrieved from at least one of: an account of the at least one user, and at least one employee record of a corporate employing the at least one user.

20. The system of claim 18, further comprising transmitting the at least one personal data item to at least one PSAP in response to at least one AML query received from the at least one PSAP, the at least one PSAP transmits the at least one AML query in response to receiving the at least one emergency call from the at least one cellular device.

* * * * *